(12) United States Patent
Hintze et al.

(10) Patent No.: US 7,347,651 B2
(45) Date of Patent: Mar. 25, 2008

(54) DRILLING DEVICE

(75) Inventors: Wolfgang Hintze, Hamburg (DE); Rolf Clausen, Norderstedt (DE); Martin Plucinski, Asendorf (DE); Enno Stöver, Hamburg (DE); Friedrich Meißner, Leverkusen (DE)

(73) Assignee: Airbus Deutschland (DE)

( * ) Notice: Subject to any disclaimer, the term of this patent is extended or adjusted under 35 U.S.C. 154(b) by 486 days.

(21) Appl. No.: 10/785,900

(22) Filed: Feb. 23, 2004

(65) Prior Publication Data

US 2004/0191016 A1  Sep. 30, 2004

(30) Foreign Application Priority Data

Feb. 24, 2003 (DE) ................ 103 08 089

(51) Int. Cl.
*B45B 45/00* (2006.01)

(52) U.S. Cl. .................. 408/67; 408/112; 408/130

(58) Field of Classification Search ................ 408/67, 408/112, 130, 110, 111, 712
See application file for complete search history.

(56) References Cited

U.S. PATENT DOCUMENTS

| 1,647,396 | A | * | 11/1927 | Galloway | ............. | 408/241 R |
| 2,488,992 | A | * | 11/1949 | Taylor | .............. | 188/313 |
| 2,883,891 | A | * | 4/1959 | Robinson et al. | ............ | 408/112 |
| 2,994,235 | A | * | 8/1961 | Rise | .............. | 408/112 |
| 3,077,547 | A | * | 2/1963 | Metko | .............. | 173/217 |
| 4,097,176 | A | * | 6/1978 | Wanner et al. | .............. | 408/56 |
| 4,242,016 | A | * | 12/1980 | Faris | .............. | 408/14 |
| 4,250,971 | A | * | 2/1981 | Reibetanz et al. | ............ | 173/21 |
| 4,534,682 | A | * | 8/1985 | Carlson | .............. | 408/14 |
| 4,652,184 | A | * | 3/1987 | Fischer | .............. | 408/67 |
| 4,752,161 | A | * | 6/1988 | Hill | .............. | 408/67 |
| 4,764,060 | A | * | 8/1988 | Khurana | .............. | 408/14 |
| 5,033,917 | A | * | 7/1991 | McGlasson et al. | .......... | 408/67 |
| 5,071,293 | A | * | 12/1991 | Wells | .............. | 408/112 |
| 5,096,342 | A | * | 3/1992 | Blankenship et al. | ....... | 408/112 |
| 5,129,467 | A | * | 7/1992 | Watanabe et al. | ............ | 173/75 |
| 5,238,336 | A | * | 8/1993 | Sanders et al. | .............. | 408/95 |
| 5,688,082 | A | * | 11/1997 | Richardson | .............. | 408/67 |
| 5,988,954 | A | * | 11/1999 | Gaskin et al. | .............. | 408/67 |

(Continued)

FOREIGN PATENT DOCUMENTS

GB             557254        *  11/1943

*Primary Examiner*—Daniel W. Howell
(74) *Attorney, Agent, or Firm*—Kelly Lowry & Kelley LLP

(57) ABSTRACT

In order to improve a device (100) for a drilling machine (10) known per se for manual drilling with a casing (11), a grip (12), a tool chuck (13) and a tool (14), especially a drilling, reaming or counterboring tool, in such a way that manual drilling can be carried out with optimum conditions, it is proposed that the device comprises a

- workpiece jigging device (15) with at least one contact face and
- a guide device (21) for the parallel guidance of the tool (14) and/or of the casing (11) when there is a displacement of the workpiece jigging device (15) relative to the casing (11), said displacement being coaxial with a machine axis and/or tool axis, and
- a suction-type extraction device (18) for conveying away and sucking away material chips, dusts and impurities from the area of the workpiece jigging device (15), or more precisely the machining point and
- a control device (27) for the control of the feed motion between the workpiece jigging device (15) and the casing (11), said control being active at least in sections along the path.

38 Claims, 4 Drawing Sheets

U.S. PATENT DOCUMENTS

| | | | |
|---|---|---|---|
| 5,993,122 A * | 11/1999 | Baker | 408/67 |
| 6,200,075 B1 * | 3/2001 | Gaskin et al. | 408/67 |
| 6,413,022 B1 * | 7/2002 | Sarh | 408/76 |
| 6,443,676 B1 * | 9/2002 | Kopras | 409/182 |
| 6,851,898 B2 * | 2/2005 | Ege et al. | 408/67 |
| 6,964,546 B1 * | 11/2005 | Vakil | 408/110 |

* cited by examiner

DRILLING DEVICE

TECHNICAL FIELD

The invention relates to a device according to the preamble of claim 1.

PRIOR ART

Devices are known for the suction-type extraction of chips and dusts arising during drilling, either adapted to the drilling machine (machine tool or manual drilling machine) or as a separate component (e.g. DE 4313658 C1, DE 2715378 C2, DE 3340090 A1, DE 4038941 C2, DE 10000015 A1, DE 3605204 A1, DE 3835582 A1, DD 19860182 C2).

Devices are known that provide a depth stop during manual drilling, either adapted to the drilling machine or as a separate component (e.g. DE 7724047 U1, AT 350778 B).

Devices are known that dampen the feed motion during manual drilling, either adapted to the drilling machine or as a separate component (e.g. DE 19639122 A1).

Devices are known that provide a depth stop and suction-type extraction of chips and dusts arising during the drilling process, either adapted to the drilling machine or as a separate component (e.g. DE 3509199 C2).

So-called stop holders are known, which guide drilling, counterboring and reaming tools during manual drilling (e.g. CH 464649 A). The contact surface can be over of the full area or can be formed by three or four contact feet. The tool is clamped via an interface with thread and conical seat. The concentric running guide of the tool can be uncoupled via a pendulum shaft from the motion of the drilling machine. An adjustable depth stop can be included and the stroke path can be spring-loaded. The device is separated from the drilling machine. Drawbacks of the devices are the usually long construction (the risk of tilting of the tool therefore exists despite the pendulum shaft) and the need for a tool with a threaded shaft (high consumption costs). Furthermore, no damping and no suction-type extraction is included with these devices.

Devices are known which guide drilling and reaming tools during manual drilling. Three- or four-legged drilling frames (integrated suction-type extraction is possible) are used, which are used with drill bushes of hardened steel adapted in each case to the tool diameter to be used. Machine, suction-type extraction, angular alignment and tool guide are two or three separate objects here, which means that manipulation with two hands is required, which in turn makes skill and training or two workers a prerequisite. Furthermore, this device does not include any damping. Moreover, expensive hardened drill bushes and very long tools (>120 mm) are required. Finally, a high noise level is generated by the suction-type extraction.

Hydraulically or pneumo-hydraulically operated drilling devices are known, with which a constant, ideally regulatable feed motion of the drilling tool is achieved pneumatically or hydraulically (e.g. AT 383538 B, CH 544618 A).

All of the mentioned devices are unable to provide simultaneously guidance of the tool (guarantee of roundness, cylindricity and squareness), a depth stop, damping and suction-type extraction with a manual machining process.

One aim consists therefore in developing a process-reliable manual drilling process of materials or material composites, in particular with a view to reducing delamination (working loose of individual fibres from the bonding resin) and burr formation, preventing tool breakages and cutting-edge and cutting-corner chips and complying with required diameter tolerances, with the simultaneous suction-type extraction of chips and dusts arising.

The following processes are to be taken into account here: full drilling, redrilling, reaming, counterboring, drilling of blind holes, drilling of through-holes and combinations of these processes.

Essential problems of manual drilling with the known devices that need to be solved arise on account of the unregulated feed. This particular feature of manual drilling often leads to delamination (working loose of individual fibres from the bonding resin) when machining fibre composite materials or laminated composite materials (e.g. CFRP (carbon-fibre reinforced plastics), FRP (fibrous-glass reinforced plastics), AFRP (aramid-fibre reinforced plastics), Glare (glass fibre reinforced aluminium), derived timber products), as well as to increased burr formation when machining metal materials (e.g. aluminium, steel, titanium). Furthermore, on account of the manually controlled feed in the manual process, the tool has a tendency to become screwed at the tool exit through the material. This in turn often leads to tool breakages, precisely in the case of small tool diameters.

Apart from the unregulated feed, hand-guided machining is a further problem, as a result of which non-round holes, with which the required tolerances are not met, can arise. Furthermore, the manual guidance can lead to non-compliance with the squareness of the hole to the workpiece surface.

Chips and dusts generally arise during the cutting of materials, as a result of which the use of suction-type extraction may be required, in particular in the case of dusts hazardous to health. This can however lead to high noise levels if the geometry of the suction-type extraction device is not designed in the optimum manner.

Existing drilling devices can be criticised inasmuch as there are no devices which simultaneous include a guide for the tool (guarantee of roundness, cylindricity and squareness), a depth stop, damping and suction-type extraction during manual drilling. Furthermore, some drilling devices require long tools, and this in turn leads to high consumption costs. In addition, expensive hardened drill bushes are usually required to guide the tools. A further important critical point is the fact that the stroke, or more precisely the adjustment range, of the existing devices is too small and too inflexible for some tasks and usually there is not a good view of the machining point. Finally, the existing devices are in need of improvement in terms of handling and ergonomics.

PRESENTATION OF THE INVENTION, PROBLEM, SOLUTION, ADVANTAGES

The problem of the invention is to improve a device of the type mentioned at the outset such that it becomes possible to carry out manual drilling with optimum conditions in terms of feed, compliance with predetermined drilling depth, keeping the drilling-point clean, compliance with work safety regulations in terms of dust pollution, and with optimum compliance with the drilling requirements in terms of dimensional accuracy and compliance with squareness and roundness of the holes and freedom of the hole edge from burr formation, delamination, chips, whereby drilling, reaming or counterboring tools are to be used as the tool.

This problem is solved by a device with the features of claim 1.

The essential features of the invention compared with the prior part are as follows:

- guidance (guarantee of roundness, cylindricity and squareness), adjustable damping, adjustable feed path/depth stop and suction-type extraction in one device
- guidance of the tools at a predeterminable angle (e.g. 90°, 45° or such like) to the workpiece surface without expensive drill bushes, although the use of drill bushes is optionally possible
- arrangement of the linear guide at least partially in the peripheral area of the drilling machine, so that a large construction length is not required
- reliable suction-type extraction of chips and dusts arising short tools or ones that are available as standard
- automatic lubrication of tools possible in principle
- good view of drilling point
- better manipulation and ergonomics due to small construction volume and optional use of suction pipe as grip
- maintenance-friendly.

The use of the present device for manual drilling is suitable in many areas.

Thus, a typical case of application can be seen in aircraft construction and aircraft assembly for producing rivet holes. In this case, work would take place with materials whose dusts arising during drilling work are hazardous to health (e.g. CFRP, FRP, Glare), metallic materials (e.g. aluminium, titanium, steel), as well as composites of said materials. It emerges precisely in manual drilling work with high-strength materials such as titanium, for example, that the drilling device, through the damping and the associated uniform feed motion, contributes towards greatly reduced wear of hard-metal tools due to forced breakages and forced chipping. Furthermore, the device can be used to advantage in the machining of brittle materials (e.g. chipboard, gypsum, glass) in order to avoid chips at the edges of holes.

However, since the machining of, for example, derived timber products and plastics is also possible with the device, other areas of application for the present drilling device lie in the building trade and the shipbuilding industry, in the furniture industry, the wind-energy industry, in the do-it-yourself sector and in general handicraft work, because here too there is the problem of the screwing-through of tools at the tool exit through the material and the formation of chips and dusts which have to be extracted by suction.

The invention provides a device for manual drilling with integrated depth stop, damping and suction-type extraction, for the guidance of drilling, reaming and counterboring tools at any angle to the workpiece surface.

According to the invention, this device for manual drilling according to claim 1 is used for machining metallic materials (e.g. aluminium, steel, titanium) and/or plastics (e.g. PVC (polyvinyl chloride)) and/or composite materials (e.g. CFRP (carbon-fibre reinforced plastics), RFP (fibrous-glass reinforced plastics), AFRP (aramid-fibre reinforced plastics), Glare (glass fibre reinforced aluminium)) and/or derived timber products (e.g. natural wood/chipboard) and/or laminated composite materials consisting of any combinations of the aforementioned materials.

According to a preferred form of embodiment, provision is made such that the control device is a damping device and/or a spring device. A large number of different damping or spring devices are conceivable here, and also in combination. It has proved advantageous when the damping is adjustable in dependence on the displacement path. Particularly high damping in the area of the exit of the tool from the workpiece is thus advantageous, more precisely with a view to avoiding delamination (working loose of individual fibres from the bonding resin), burr formation and chips. It is not desirable here for the feeding force raised due to damping to be effective over the whole displacement movement, because the physical burden on the worker would thus be greatly increased.

When drilling laminated composites, a low level of damping is often sufficient in the respective transitions between the material layers. In order to meet these different requirements, provision is made according to the invention such that a hydraulic impact damper, which can be regulated, or two or more hydraulic impact dampers connected in series, which can be regulated, are arranged. Two or more impact dampers can also be arranged in parallel. By connecting several impact dampers in series, it is possible for example to establish optimum behaviour when using a drilling device provided with the device according to the invention on a composite material that is always the same, in such a way that easy penetration of the material composite is enabled and a high level of damping is achieved in the area of the tool exit. The arrangement of the impact dampers can take place radially off-centre parallel to the machine axis and/or tool axis. Preferably, the impact damper or dampers are provided as separate and replaceable components, in order to enable easy replacement in the event of wear and easy replacement when adapting to the given work process. It is also conceivable for the damping device to be one or more hydraulic or pneumatic dampers optionally with an adjustable characteristic, one or more rubber dampers or a combination device consisting of dampers or springs. It is also conceivable here, for example, for different springs to be connected in a row one behind the other, in order to achieve a certain resistance characteristic with the displacement motion. It is also conceivable for the damping device to be designed as feed damping by mechanical friction of two friction partners, which are arranged radially off-centre parallel to the machine axis and/or tool axis.

Provision is made according to the invention such that the device has an integrated feed path adjustment, or more precisely an integrated depth stop. This can easily be achieved according to the invention in that, as an alternative to a separate stop as the depth stop, the endpoint of the damping device or spring device is used. Provision is made such that the depth stop is essentially formed by the workpiece jigging device, the guide device and the control device.

The guide device is formed according to the invention by one or more linear guides arranged radially off-centre parallel to the machine axis and/or workpiece axis, said linear guides being mounted in one or more guide bushes. Alternatively, it is also possible for the axial guide of the tools (14) to be formed by two or more hollow cylinders displaceable within one another and arranged coaxial with the machine axis and/or tool axis.

By a suitable selection of the guide bushes in the fixing piece and fixing counter-piece, it is possible to achieve a permanent high operating precision. For this purpose, the invention provides for the use of a fairly lengthy guide bush or several guide bushes for the guide shafts, if need be with the use of a further fixing piece or a further fixing counter-piece, in order to ensure parallelism even after a long period in use.

Provision is also preferably made such that the profile of the linear guide or the linear guides is formed with a suitably selected cross-section such that a minimisation of wear and thus a longer reliable useful life are achieved. For this, provision is made such that the profile of the linear guide or the linear guides is formed as a full-round cross-section and/or hollow-cylinder cross-section and/or triangle cross-section and/or trapezium cross-section and/or rectangle and/or square cross-section and/or as a dovetail profile and that the profile of the respective guide bushes is designed accordingly.

In order to provide the suction-type extraction device, provision is made according to the invention such that the suction-type extraction can be carried out via a suction pipe leading away laterally from the tool axis and fitted close to the action point, i.e. the penetration point of the tool into the workpiece. Provision can be made such that the suction pipe can be used as a grip. However, in order to ensure that the high forces caused by the holding of the drilling machine and by the drilling itself do not lead to tilting of the device, provision can be made such that the suction-type extraction is effected by a suction pipe fitted close to the action point and running radially off-centre parallel to the machine and/or tool axis.

According to a preferred form of embodiment, provision is made such that the workpiece jigging device has, in the area of the intended contact plane, two, three or more contact surfaces in the form of two, three or more arranged contact feet with or without attachments of rubber or plastic.

Provision is made according to a preferred form of embodiment such that the diameter of the contact surfaces can be varied by means of laterally extendable contact feet. According to a further preferred form of embodiment, the height of the individual contact feet is variable, in order to enable a vertical position on uneven surfaces. Provision can also be made to rigidly fix a predetermined angle of the device to the workpiece surface and to retain the same during the machining operation.

Overall, the design of the device according to the invention enables a good handling capability of the drilling machine equipped according to the invention. In order to optimise this, provision is made to arrange the guide device in an upper plane in order to guarantee good handling capability, whereby the invention also provides for a rotating capability of the device with respect to the casing of the machine tool.

Provision is further made such that the linear guide or linear guides is/are rotatable through at least 90° about the tool axis or the machine axis, in particular rotatable through at least 180° about the tool axis in the case of a pistol and rod drilling machine. Optimum adaptability of the machine to the given application can thus be achieved. The workpiece jigging device is also designed, according to the invention, for a particularly favourable handling capability. For this purpose, provision is made such that there is formed in the workpiece jigging device at least one opening, through which a view of the action point of the tool is provided and which is optionally closed by a viewing window of glass, transparent plastic or suchlike. The closing of the viewing window not only increases safety, since neither cutting material cannot fall out by accident nor can unintended air contamination occur, but the closing of the opening by a viewing window also enables optimum air circulation in cooperation with the suction-type extraction device, so that the action point can be kept clean in the optimum manner.

In order to minimise the risk of injury, it is possible to provide a protective casing in the drill chuck.

Advantageous configurations and developments emerge from the sub-claims.

BRIEF DESCRIPTION OF THE DRAWINGS

An example of embodiment of a device according to the invention is shown in the drawing.

BEST WAY OF PERFORMING THE INVENTION

Figure 1:
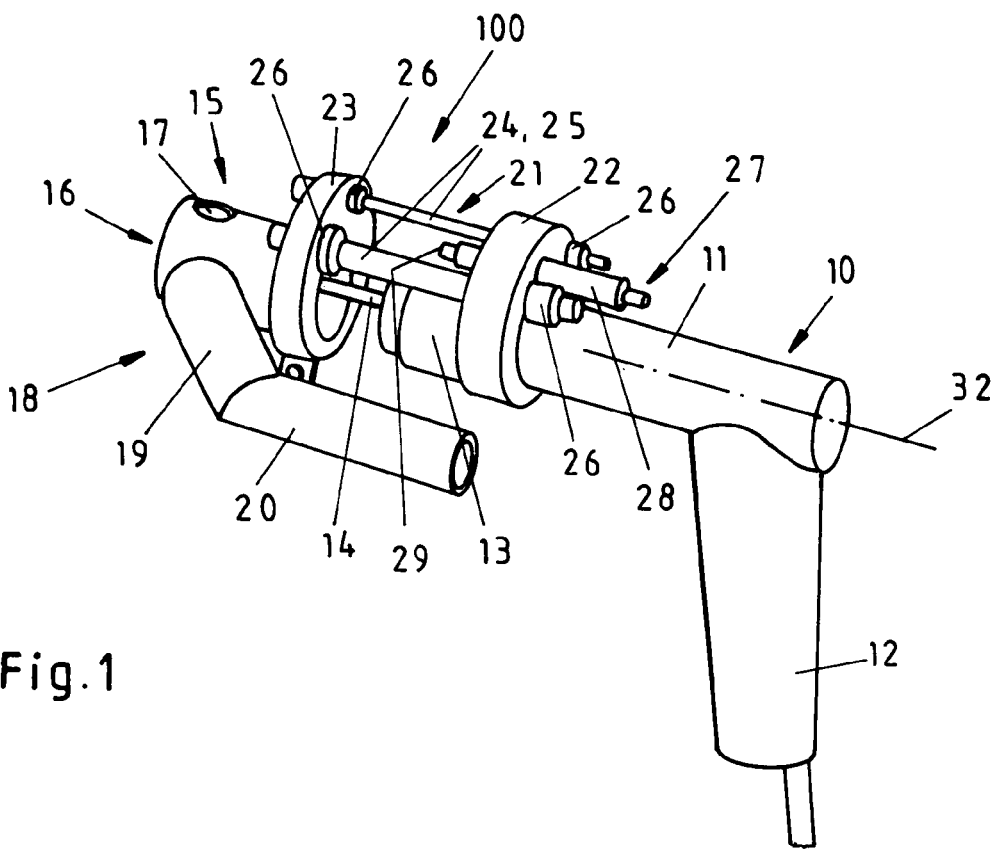
FIG. 1 shows, in an illustrative representation, the device according to the invention on a drilling machine in an initial position.
Figure 2:
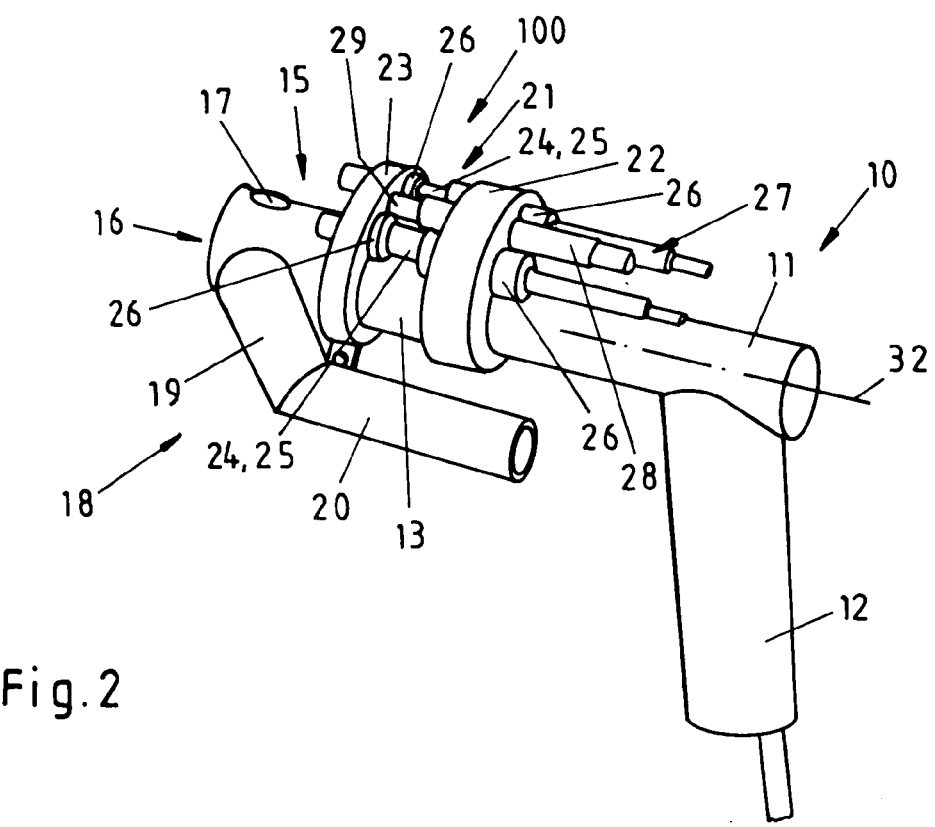
FIG. 2 shows the device according to FIG. 1 in an end position.

FIGS. 1 and 2 show an example of embodiment of a device 100, which is arranged on a drilling machine 10. This is a drilling machine 10 known per se for manual drilling, which in the usual way has a casing 11, a grip 12 and a tool chuck 13 for a tool 14.

Device 100 consists of a workpiece jigging device 15, with a contact surface 16, which can have contact feet not shown in FIGS. 1 and 2. An opening 17 is made in workpiece jigging device 15 in order to be able to see the action point of tool 14. Also arranged on workpiece jigging device 15 is suction-type extraction device 18, which enables material chips, dusts and impurities to be conveyed via suction pipe 19 out of the area of the workpiece jigging device, or more precisely the machining or action point. For this purpose, suction pipe 19 is provided with a connection piece 20, to which a tube (not shown) can be connected. In the form of embodiment shown in FIGS. 1 and 2, connection piece 20 is led parallel to the machine axis or tool axis and thus leads to a compact construction of device 100. Guide device 21 has a fixing piece 22 as a connection body to drilling machine 10 and a fixing counter-piece 23 as a carrier of workpiece jigging device 15. Fixing piece 22 and fixing counter-piece 23 are connected via two linear guides 24, which are designed as guide bolts 25 which are arranged in guide bushes 26 in fixing piece 22 and fixing counter-piece 23 respectively, so that parallel guidance to the tool axis is always guaranteed when there is a coaxial displacement of the workpiece jigging device.

Control device 27 is formed in this example of embodiment by an impact damper 28, which is arranged on fixing piece 22 and its action tip 29 is acted on by fixing counter-piece 23. In the example of embodiment shown in FIGS. 1 and 2, only guide device 21 acts initially in the starting position shown in FIG. 1. When a contact position (not shown in the drawing) of action tip 29 of impact damper 28 on fixing counter-piece 23 is reached with a displacement movement of fixing counter-piece 23 onto fixing piece 22, impact damper 28 is activated and the control of the feed motion takes place via impact damper 28.

Figure 12:
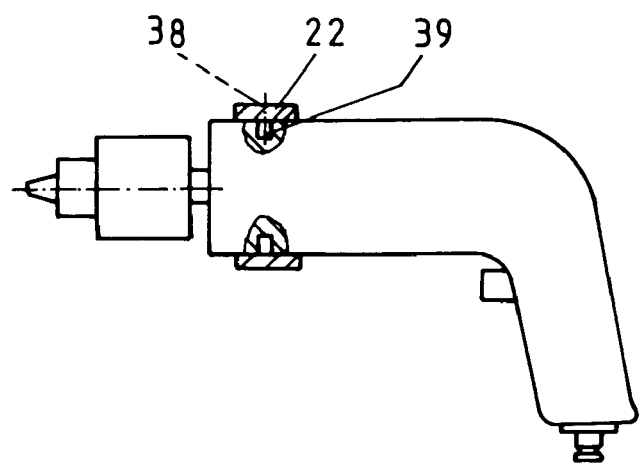
FIG. 12 shows, in a purely diagrammatic representation, the fixing with the use of screws.

Device 100 Described Above Operates as Follows:

Fixing piece 22 connects the employed compressed-air operated pistol drilling machine 10 rigidly with device 100. Device 100 is fitted on machine 10 in a rotatable manner in this example of embodiment. This allows the device to be adapted very flexibly to the ergonomic differences of workers (right/left-handed, size of hands) as well as to the spatial restrictions of the machining situation. The conical shape of the fixing protects against axial slipping. Twisting is protected against by three threaded holes, into which headless screws can be turned, which engage in matching blind holes of the drilling machine used. The threaded holes, the headless screws and the blind holes are shown in FIG. 12.

Guide device 21 is formed by two guide shafts called linear guides 24, which are each guided in fixing piece 22 via two maintenance-free insert bushes 26 of plastic. As a result of the fact that compression springs (not shown) are arranged on linear guides 24, workpiece jigging device 15 is always carried back to the initial position when released. An end stop cushioned with rubber gaskets prevents sliding-out of the drill frame due to the spring power.

Figure 5:
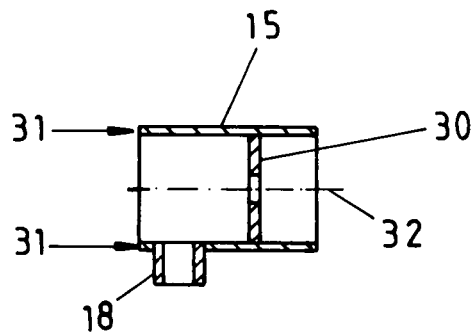
FIG. 5 shows, in a purely diagrammatic representation, the workpiece jigging body.

Suction-type extraction device 18 is formed by suction pipe 19 which is clamped in workpiece jigging device 15 (FIG. 5). For the suction-type extraction, there is provided on suction pipe 19 a hollow grip (connection piece 20) through which the occurring chips and dusts can be sucked away. Due to the fact that suction pipe 19 is clamped into workpiece jigging device 15, the whole extraction system can be rotated with the grip into the position that is ergonomically most convenient in each case. An air baffle 30 (FIG. 5) is also provided in workpiece jigging device 15 in order to guarantee better suction-type extraction. For the secure and vertical positioning of workpiece jigging device 15 on the workpiece, three grooves 31 (FIG. 5) are provided, so that the workpiece jigging device rests on three feet on the workpiece. Finally, a hole 17 is provided for a better view of the drilling tool.

The core of the device is formed by the small-impact damper/feed oil brake 28, which can be screwed into fixing piece 22 and which on the one hand is used as a depth stop and on the other hand permits adjustable damping of the feed. A controlled uniform tool exit can thus be guaranteed.

On account of the small construction volume, the described example of embodiment of the invention is very light. The total weight amounts to approx. 650 g.

The tool can be clamped simply in the three-jaw chuck of the drilling machine without risk of damage and without the device having to be dismantled from the drilling machine.

Figure 3:
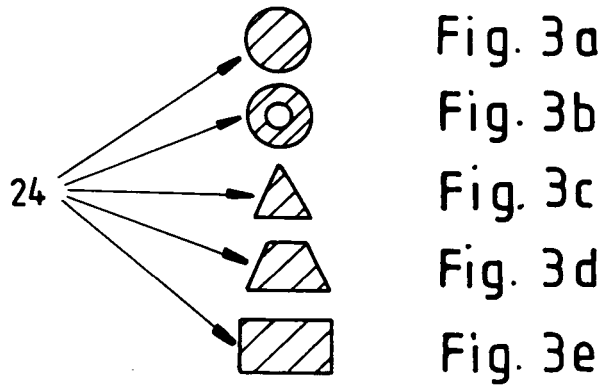
FIG. 3 shows, in a purely diagrammatic representation, possible cross-sections of the guide shaft
Figure 4:
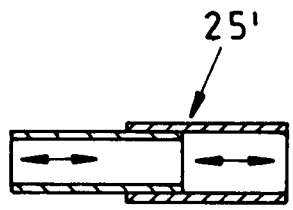
FIG. 4 shows, in a purely diagrammatic representation, the design of the coaxial guide

FIGS. 3 to 5 show details of device 100 according to FIGS. 1 and 2. As can be seen from FIG. 3, the cross-section profile of guide bolts 25 can be designed as a full-round (FIG. 3a), as a hollow-cylinder (FIG. 3b), as a triangle (FIG. 3c), as a trapezium (FIG. 3d) or as a rectangle/square (FIG. 3e). It is also possible to use a telescoping guide bolt instead of a continuous guide bolt, as is shown in FIG. 4. The design of workpiece jigging device 15 is shown diagrammatically in FIG. 5. It emerges from the cross-section shown that guide device 15 is provided with suction pipe 19, which in combination with plate 30 acting as an air baffle provides for the suction-type extraction of all impurities occurring when workpiece jigging device 15 is placed on a workpiece (not shown). Grooves 31, which are not shown in detail, also provide for a corresponding inflow of fresh air in order to enable extraction of impurities via suction pipe 19.

Figure 6:
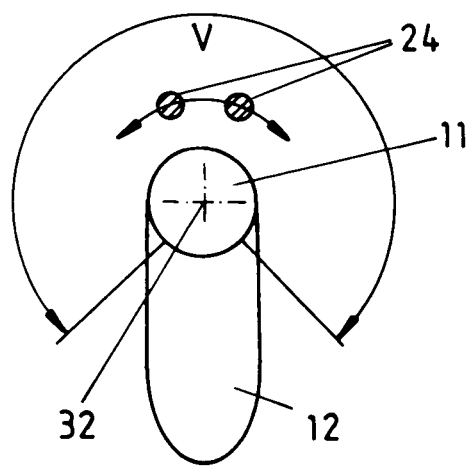
FIG. 6 shows, in a purely diagrammatic representation, the peripheral area of a pistol drilling machine, in which the linear guide is arranged at least partially and which can optionally be used for a rotary adjustment of the device with respect to the drilling machine.

FIG. 6 indicates the adjustment range V of guide device 21 about tool or machine axis 32.

Figure 7:
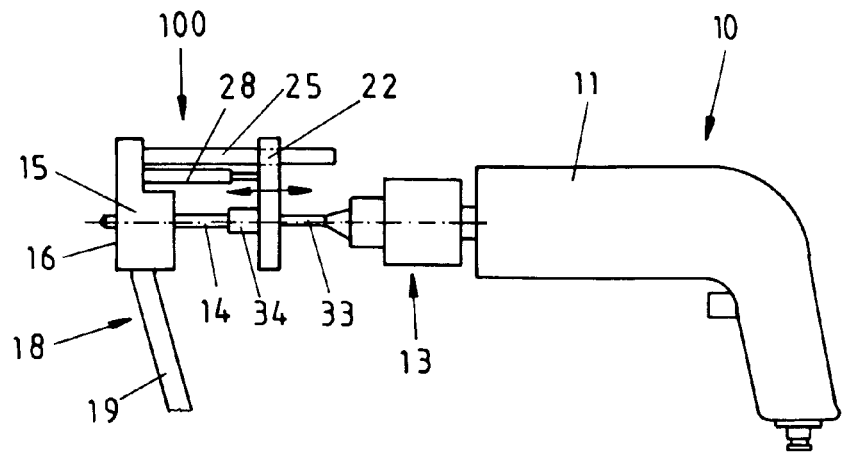
FIG. 7 shows, in a purely diagrammatic representation, the arrangement of the device as a separate component on a pistol drilling machine with a guide through the bearing.
Figure 8:
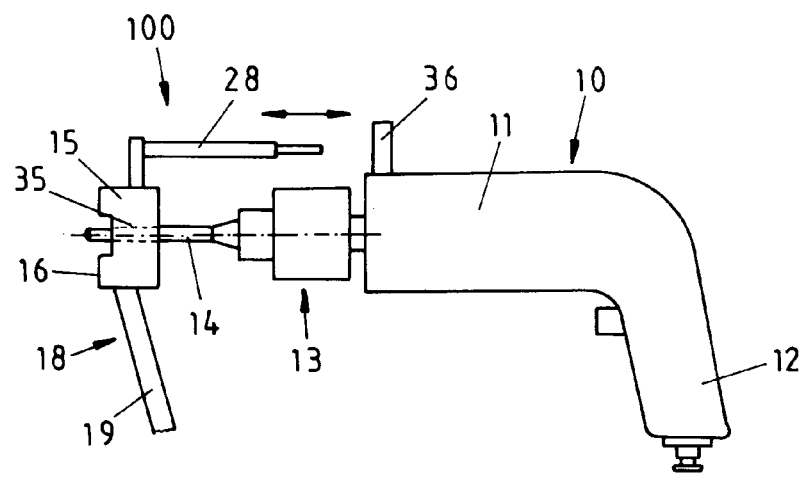
FIG. 8 shows, in a purely diagrammatic representation, the arrangement of the device as a separate component on a pistol drilling machine with a guide through a drill bush.

FIGS. 7 and 8 show two further forms of embodiment of device 100, whereby an arrangement as a separate component on a pistol drilling machine is provided here.

With the form of embodiment shown in FIG. 7, there is clamped in tool chuck 13 a shaft 33, which is mounted in fixing piece 22 and carries a spring chuck 34 on the side opposite its clamping point. Tool 14 is clamped in spring chuck 34 and fixing piece 22, spring chuck 34 and shaft 33 are guided via guide bolts 25 and damped via impact damper 28. Workpiece jigging device 15 has a contact surface 16 and suction-type extraction device 18. Provision is made such that the device can be held with the second hand by means of suction pipe 19.

In the form of embodiment in FIG. 8, tool 14 is clamped in the machine by means of tool chuck 13 and is guided through drill bush 35. The damping takes place by means of impact damper 28 and stop 36 on drilling machine 10. Workpiece jigging device 15 includes contact surface 16, a drill bush 35 and suction-type extraction device 18. Provision is also made here such that the device can be held with the second hand.

Figure 9:
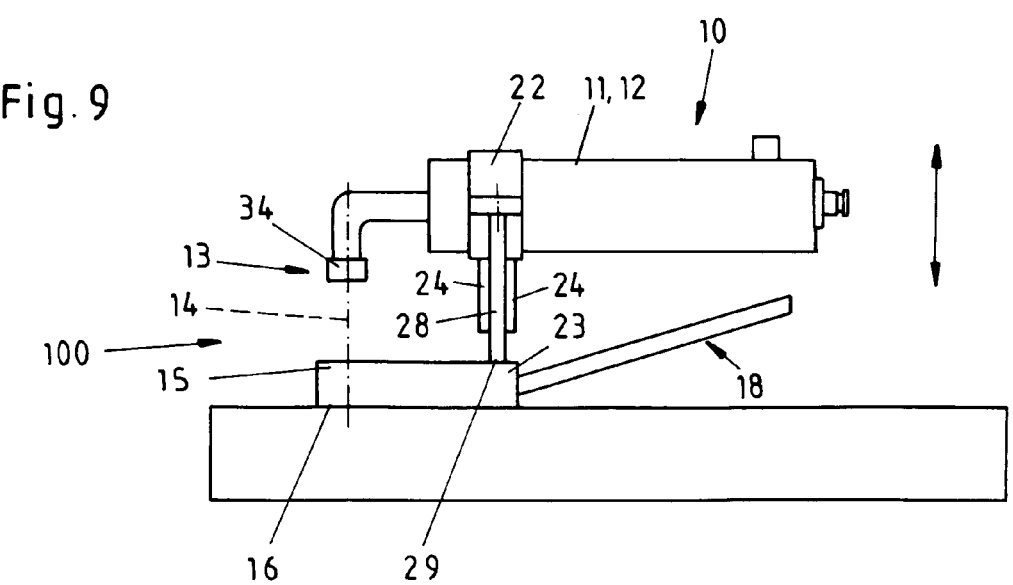
FIG. 9 shows, in a purely diagrammatic representation, the arrangement of the device on an angle drilling machine.

FIG. 9 shows the adaptation of device 100 to an angle drilling machine.

With this form of embodiment, drilling machine 10 and tool 14 are guided by two linear guides 24 at the side of the machine. Impact damper 28 is arranged between linear guides 24 and presses with its action tip 29 against workpiece jigging device 15 and is thereby supported on drilling machine 10. Workpiece jigging device 15 has contact surface 16, optionally a drill bush and suction-type extraction device 18.

Figure 10:
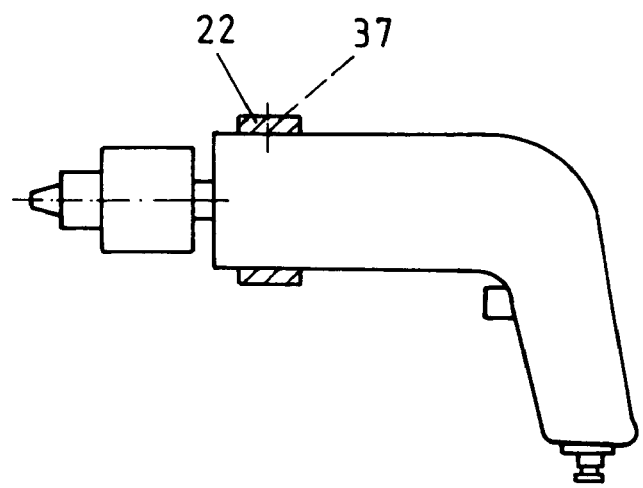
FIG. 10 shows, in a purely diagrammatic representation, the fixing of the device on a pistol drilling machine.
Figure 11:
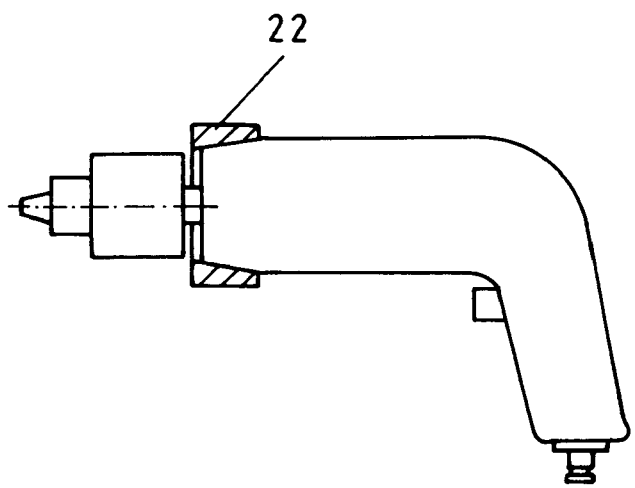
FIG. 11 shows, in a purely diagrammatic representation, the fixing of the device with a conical profile.

In view of the various possibilities for the arrangement of device 100 via fixing piece 22, FIGS. 10 to 12 show different configurations of fixing piece 22 in adaptation to the various forms of casing 11 of a drilling machine 10. Provision is made in FIG. 10 such that the fixing of device 100 takes place by means of a screw 37. In the arrangement according to FIG. 11, fixing piece 22 provided with a conical profile is slid in a clamping manner onto casing 11 of drilling machine 10. In the form of embodiment according to FIG. 12, fixing piece 22 is fixed by means of headless screws 38 which are screwed into blind holes 39.

DEVICE REFERENCE NUMBERS 100 device
10 drilling machine
11 casing
12 grip
13 tool chuck
14 tool
15 workpiece jigging device
16 contact surface
17 opening
18 suction-type extraction device
19 suction pipe 20 connection piece
21 guide device
22 fixing piece
23 fixing counter-piece
24 linear guide
25 guide bolts
26 guide bushes
27 control device
28 impact damper
29 active tip
30 plate
31 grooves
32 axis
33 shaft
34 spring chuck
35 drill bush
36 stop
37 screw
38 headless screw
39 blind hole
V adjustment range

The invention claimed is:

1. A device (100) for a manual drilling machine (10) having a casing (11), a grip (12), a tool chuck (13) and a drilling, reaming or counterboring tool (14), characterized in that the device (100) comprises:
    a workpiece jigging device (15) with at least one contact surface and
    a guide device (21) for the parallel guidance of the tool (14) and of the casing (11) when there is a displacement of the workpiece jigging device (15) relative to the casing (11), said displacement being coaxial with a machine axis and/or tool axis, and
    a suction-type extraction device (18) for conveying away and sucking away material chips, dusts and impurities from the area of the workpiece jigging device (15), and
    a control device (27) for the control of the displacement of the workpiece jigging device (15) relative to the casing (11), said control device (27) being active at least in sections along the displacement path, wherein the control device (27) provides a variable restraining force along the displacement path dependent upon a rate of displacement and an amount of displacement.

2. The device according to claim 1, characterized in that the device has an integrated depth stop at an end point of the damping device or a spring device.

3. The device according to claim 2, characterized in that the depth stop is essentially formed by the workpiece jigging device (15), the guide device (21) and the control device (27).

4. The device according to claim 1, characterized in that the device slidingly engages the drilling machine (10) or is integrated into the drilling machine (10) along the casing.

5. The device according to claim 1, characterized in that the device (100) is rigidly connected with the drilling machine (10), which can be a pistol drilling machine electrically operated or compressed-air operated or an angle drilling machine electrically operated or compressed-air operated or a rod drilling machine electrically operated or compressed-air operated.

6. The device according to claim 1, characterised in that the device (100) further comprises a semi-cylindrical fixing piece (23) clamped behind a drill chuck or on a shaft of a drilling machine (10).

7. The device according to claim 1, characterised in that the device (100) mounts to the casing behind a drill chuck of the machine via a pair of corresponding hollow cylinders formed in the device (100) and the casing, into which a screw (37) engages radially.

8. The device according to claim 1, characterised in that the casing, a fixing piece, and a fixing counter-piece are conical to prevent axial slipping or twisting.

9. The device according to claim 8, characterised in that device (100) is secured against axial slipping or twisting by engaging the screws (37) radially in the casing and the fixing piece.

10. The device according to claim 1, characterised in that the guide device (21) is formed by one or more of linear guides (24) arranged radially off-centre parallel to the machine axis and/or tool axis, said linear guides being mounted in one or more guide bushes (26).

11. The device according to claim 10, characterised in that the profile of the linear guide (24) or the linear guides is designed as a full-round cross-section, hollow-cylindrical cross-section, triangular cross-section, trapezium cross-section, rectangular cross-section, square cross-section, or as a linear guide not completely enclosed.

12. The device according to claim 10, characterised in that a peripheral area around the drilling machine (10) is used at least partially as a displacement path of the linear guides (24).

13. The device according to claim 10, characterised in that the linear guide/s is/are rotatable through at least 180° about the tool axis.

14. The device according to claim 10, characterised in that a spring device is formed by one or more springs, whereby each spring is arranged radially off-centre and parallel to the machine axis or the tool axis on the device.

15. The device according to claim 10, characterised in that an axial guide of the tools (14) is formed by two or more hollow cylinders displaceable within one another and arranged coaxial with the machine axis and/or tool axis.

16. The device according to claim 10, characterised in that one or more compression springs are arranged around or parallel to the linear guide/s (24).

17. The device according to claim 3, characterised in that the depth stop is rubber-cushioned.

18. The device according to claim 1, characterised in that the suction-type extraction can be carried out via a suction pipe (19) leading away laterally from the machine axis and/or tool axis and fitted close to an action point.

19. The device according to claim 18, characterised in that the suction-type extraction can be carried out via the suction pipe (19) lying radially off-centre parallel to or coaxial with the machine axis and/or tool axis and fitted close to the action point.

20. The device according to claim 18, characterised in that the suction pipe (19) is rotatable about the machine axis and/or tool axis and can be used as a grip.

21. The device according to claim 20, characterised in that the suction pipe functions as a separate second grip, which also performs the feed motion of the tool (14) via the workpiece jigging device.

22. The device according to claim 21, characterised in that the separate second grip does not perform the feed motion of the tool (14) via the workpiece jigging device.

23. The device according to claim 18, characterised in that a small air flow and an associated optimum suction-type extraction is guaranteed by a perforated plate/baffle plate fitted in the extraction area.

24. The device according to claim 1, characterised in that a vertical position or a predeterminable angle to the workpiece surface is guaranteed by means of at least two or more contact feet fitted at the end of the device (100).

25. The device according to claim 24, characterised in that the diameter of a contact area can be varied by means of laterally extendable contact feet.

26. The device according to claim 25, characterised in that the height of the individual contact feet can be varied in order to enable a vertical position or a predeterminable angle on uneven surfaces.

27. The device according to claim 1, characterised in that there is formed in the workpiece jigging device (15) at least one opening (17), through which a view of the action point of the tool (14) is provided, said opening being closed by a viewing window of glass or transparent plastic.

28. The device according to claim 1, characterised in that the damper device is one or more hydraulic or pneumatic dampers, one or more rubber dampers, or a combination device of damper(s) and spring(s).

29. The device according to claim 1, characterised in that the damping device is designed as a feed damper operated by mechanical friction of two friction partners, which are arranged radially off-centre parallel to the machine axis and/or tool axis.

30. The device according to claim 3, characterised in that the depth stop is arranged radially off-centre parallel to the machine axis and/or tool axis, whereby the end point of the impact damper (28) is used as the depth stop.

31. The device according to claim 1, characterised in that friction locking the tool chuck (13) takes place via a three-jaw chuck fitted on the drilling machine (10) or spring-chuck holder.

32. The device according to claim 1, characterised in that a drill bush, adapted in each case to the drilling or reaming tool diameter used, is provided in the extraction space coaxial with the machine axis and/or tool axis.

33. The device according to claim 32, characterised in that holes are provided in the drill bush for the feeding of liquid lubricant to the tool (14), whereby the lubricant feed takes place through tubes fitted laterally or radially off-centre parallel to the machine axis and/or tool axis.

34. The device according to claim 33, characterised in that the lubricant can be fed to the tool (14) via a tube, which projects into an internal space of the workpiece jigging device.

35. The device according to claim 33, characterised in that the lubricant feed is triggered by a lubrication impulse, whereby the impulse is given by an approximation or limit switch fitted on the linear guide (24) or is triggered manually.

36. The device according to claim 1, characterised in that the components subjected to a comparatively small load are manufactured from materials of low-density and the components subjected to a comparatively higher load are manufactured from high-strength materials.

37. The device according to claim 36, characterised in that the rotating and mobile parts of the drilling machine or of the device are protected against undesired contact by means of a protective casing and/or by bellows.

38. The device according to claim 1, characterised in that the suction-type extraction is formed by two or more hollow cylinders displaceable within one another and fitted close to the action point, said hollow cylinders being arranged coaxial with the tool axis, whereby a pipe fitted laterally or radially off-centre in parallel forms the further extraction of the chips/dust.

* * * * *

UNITED STATES PATENT AND TRADEMARK OFFICE
CERTIFICATE OF CORRECTION

PATENT NO. : 7,347,651 B1
APPLICATION NO. : 10/785900
DATED : March 25, 2008
INVENTOR(S) : Wolfgang Hintze et al.

It is certified that error appears in the above-identified patent and that said Letters Patent is hereby corrected as shown below:

On the title page item (73), in the Assignee listing, replace "Airbus Deutschland" with --Airbus Deutschland GmbH--.

Signed and Sealed this

Twenty-eighth Day of October, 2008

JON W. DUDAS
*Director of the United States Patent and Trademark Office*